United States Patent
Liang et al.

(10) Patent No.: US 8,223,797 B2
(45) Date of Patent: Jul. 17, 2012

(54) METHOD AND SYSTEM FOR SETTING UP HEADER COMPRESSION COMMUNICATION, HEADER COMPRESSION POLICY FUNCTION ENTITY

(75) Inventors: Wenliang Liang, Shenzhen (CN); Liang Gu, Shenzhen (CN); Xianhui He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 286 days.

(21) Appl. No.: 12/698,397

(22) Filed: Feb. 2, 2010

(65) Prior Publication Data

US 2010/0135330 A1 Jun. 3, 2010

Related U.S. Application Data

(63) Continuation of application No. PCT/CN2008/071476, filed on Jun. 27, 2008.

(30) Foreign Application Priority Data

Aug. 10, 2007 (CN) .......................... 2007 1 0141595
Feb. 27, 2008 (CN) .......................... 2008 1 0082634

(51) Int. Cl.
    *H04J 3/24* (2006.01)

(52) U.S. Cl. ...................... 370/474; 370/477

(58) Field of Classification Search ................. 370/229, 370/235, 464, 474, 477, 431, 445, 447; 455/39, 455/68, 70, 72; 709/246, 247
See application file for complete search history.

(56) References Cited

U.S. PATENT DOCUMENTS

| | | | |
|---|---|---|---|
| 7,366,105 | B2 | 4/2008 | Yi et al. |
| 2004/0103277 | A1 | 5/2004 | Seada et al. |
| 2004/0125793 | A1 | 7/2004 | Yi et al. |
| 2004/0264433 | A1 | 12/2004 | Melpignano |
| 2006/0120352 | A1 | 6/2006 | Agashe et al. |
| 2007/0098016 | A1 | 5/2007 | Kapoor et al. |
| 2007/0195764 | A1* | 8/2007 | Liu et al. ........................ 370/389 |
| 2009/0034526 | A1* | 2/2009 | Ahmadi et al. ................ 370/392 |
| 2009/0147804 | A1* | 6/2009 | Wang et al. .................... 370/476 |

FOREIGN PATENT DOCUMENTS

| | | |
|---|---|---|
| CN | 1507286 A | 6/2004 |
| CN | 1615618 A | 5/2005 |

(Continued)

OTHER PUBLICATIONS

Written Opinion of the International Searching Authority, PCT/CN2008/071476, dated Oct. 23, 2008, 5 pages.

(Continued)

*Primary Examiner* — Kwang B Yao
*Assistant Examiner* — Obaidul Huq
(74) *Attorney, Agent, or Firm* — Slater & Matsil, L.L.P.

(57) ABSTRACT

A method and a system for setting up header compression communication and a header compression policy function entity are disclosed herein. The method includes: a header compression enforcement function entity receives a header compression indication from a header compression policy function entity; and the header compression enforcement function entity negotiates header compression channel parameters with the other corresponding header compression enforcement function entity to set up header compression channel. A communication system and a header compression policy function entity are disclosed. The embodiments of the present disclosure overcome the failure of implementing the header compression communication in the prior art.

18 Claims, 6 Drawing Sheets

After deciding to perform header compression, the header compression policy function entity delivers a header compression indication to the header compression enforcement function entity — S201

The header compression enforcement function entity that receives the header compression indication negotiates header compression channel parameters with the other corresponding header compression enforcement function entity to set up header compression channel — S202

FOREIGN PATENT DOCUMENTS

| | | | |
|---|---|---|---|
| CN | 1859768 | A | 11/2006 |
| CN | 1992671 | A | 7/2007 |
| CN | 1996941 | A | 7/2007 |
| CN | 101163065 | A | 4/2008 |
| WO | WO 03/041424 | A2 | 5/2003 |
| WO | WO 2004/017577 | A1 | 2/2004 |
| WO | WO 2004/045234 | A1 | 5/2004 |
| WO | WO 2006/063188 | A2 | 6/2006 |
| WO | 2007/065300 | A1 | 6/2007 |

OTHER PUBLICATIONS

First Chinese Office Action, Application No. 200810082634.0, dated May 25, 2011, 8 pages.

Second Chinese Office Action, Application No. 200810082634.0, dated Jan. 29, 2012, 7 pages.

Bormann, C., ed., et al., "RObust Header Compression (ROHC): Framework and four profiles: RTP, UDP, ESP, and uncompressed," Network Working Group, Request for Comments: 3095, Jul. 2001, 168 pages.

Jonsson, L-E., "RObust Header Compression (ROHC): Terminology and Channel Mapping Examples," Network Working Group, Request for Comments: 3759, Apr. 2004, 20 pages.

WiMAX Forum Network Architecture, (Stage 2: Architecture Tenets, Reference Model and Reference Points) [Part 2], Release 1.1.0, Jul. 11, 2007, 161 pages.

* cited by examiner

METHOD AND SYSTEM FOR SETTING UP HEADER COMPRESSION COMMUNICATION, HEADER COMPRESSION POLICY FUNCTION ENTITY

CROSS-REFERENCE TO RELATED APPLICATIONS

This application is a continuation of International Application No. PCT/CN2008/071476, filed on Jun. 27, 2008, which claims priority to Chinese Patent Application No. 200710141595.2, filed on Aug. 10, 2007 and Chinese Patent Application No. 200810082634.0, filed on Feb. 27, 2008, all of which are hereby incorporated by reference in their entireties.

FIELD OF THE INVENTION

The present disclosure relates to communication technologies, and in particular, to a method and a system for setting up header compression communication, and to a header compression policy function entity.

BACKGROUND

Due to restriction of physical conditions, compared with the wired link, the radio link provides a low transmission rate and a high bit error rate. When the Internet Protocol (IP) technology is applied to a wireless network cell, the packet header overhead is too high. For example, for an IPv6 speech communication packet, the packet payload really required by the user is generally 22% of the whole packet. That leads to waste of bandwidth and increases the probability of discarding the packet due to packet errors. Without effective measures, the radio network resources are wasted and the Quality of Service (QoS) is reduced.

The header compression mechanism solves the foregoing problem, and ensures inherent flexibility of the IP. Header compression mechanisms include: Robust Header Compression (ROHC) mechanism, Real-time Transport Protocol (CRTP) Header Compression mechanism, and Extended RTP (ECRTP) Header Compression mechanism.

Taking the ROHC as an example, the ROHC is a flow-based header compression solution. In the network data transmission process, most header fields in the packet of a flow have the same field value. The ROHC mechanism obtains one reference packet in a flow. For other packets, only the information about change of the header field relative to the reference packet is sent in order to accomplish compression, save the packet header overhead, and utilize the bandwidth more efficiently. Meanwhile, the ROHC mechanism controls the frequency and the quantity of feeding back messages, detects asynchronous logics, and checks errors so that the ROHC mechanism is highly effective and considerably robust. Therefore, the ROHC mechanism provides a header compression mechanism applied to the links characterized by high bit error rates and long delay.

To communicate through the ROHC mechanism in the radio network, the network needs to set up an ROHC channel. The ROHC channel is a logical channel. In this logical channel, the ingress is a compressor, and the egress is a decompressor. The compressor corresponds to the decompressor in a one-to-one relation. The compressor performs header compression for the original data, and sends the data to the decompressor through the logical channel. The ROHC channel is a unidirectional logical channel. Meanwhile, in order to support bidirectional compression, the decompressor needs to be able to feed back information to the compressor. Therefore, the ROHC feedback channel is a logical channel that bears the feedback information. The ingress is a decompressor, and the egress is a compressor.

Worldwide Interoperability for Microwave Access (WiMax) is a wireless Metropolitan Area Network (MAN) access technology based on the Institute of Electrical and Electronics Engineers (IEEE) 802.16 standard. In FIG. 1, R1 is a radio air interface, and other interfaces wired interfaces. As shown in FIG. 1, the WiMax system includes: a Mobile Station (MS)/Subscriber Station (SS), an Access Service Network (ASN), and a Connectivity Service Network (CSN). The MS/SS is a MS, through which the user accesses the WiMax network. The ASN provides radio access services for the WiMax user MS. The ASN includes a Base Station (BS) and an ASN Gateway (ASN-GW). An ASN is sharable to multiple ASNs. The CSN provides IP connection services for the WiMax user MS, for example, Location-Based Service (LBS), multimedia multicast service, broadcast service, and IP multimedia subsystem service.

However, the prior art provides no method of setting up header compression communication.

SUMMARY

The embodiments of the present disclosure provide a method and a system for setting up header compression communication and a header compression policy function entity to implement header compression communication.

The method for setting up header compression communication in an embodiment of the present disclosure includes:
receiving, by a header compression enforcement function entity, a header compression indication from a header compression policy function entity; and
negotiating header compression channel parameters with the other corresponding header compression enforcement function entity to set up header compression channel.

A communication system provided in an embodiment of the present disclosure includes:
a header compression policy function entity, adapted to deliver a header compression indication to the first header compression enforcement function entity or the second header compression enforcement function entity if deciding to perform header compression;
a first header compression enforcement function entity, adapted to negotiate header compression channel parameters with the second header compression enforcement function entity after receiving the header compression indication; and
a second header compression enforcement function entity, adapted to negotiate header compression channel parameters with the first header compression enforcement function entity after receiving the header compression indication.

The header compression policy function entity provided in an embodiment of the present disclosure includes:
a decision-making unit, adapted to decide whether to perform header compression according to the QoS requirements of the service flow and the available resources, and trigger a delivering unit; and
a delivering unit, adapted to deliver a header compression indication to the first header compression enforcement function entity or the second header compression enforcement function entity as triggered by the decision-making unit.

In the embodiments of the present disclosure, after deciding to perform header compression, the header compression policy function entity delivers a header compression indication to the header compression enforcement function entity; the header compression enforcement function entity that receives the header compression indication negotiates header compression channel parameters with the other corresponding header compression enforcement function entity to set up a header compression channel, thus saving the radio network resources and improving the QoS.

DETAILED DESCRIPTION

In the embodiments of the present disclosure, after deciding to perform header compression, the header compression policy function entity delivers a header compression indication to a header compression enforcement function entity; the header compression enforcement function entity that receives the header compression indication negotiates header compression channel parameters with the other corresponding header compression enforcement function entity. The two header compression enforcement function entities are two sides of a header compression channel. That is, one header compression enforcement function entity is a compressor (namely, ingress of the header compression channel), and the other header compression enforcement function entity is a decompressor (namely, egress of the header compression channel). After the header compression channel parameters are negotiated, a header compression channel is set up between the two header compression enforcement function entities for implementing the header compression communication.

Figure 1:
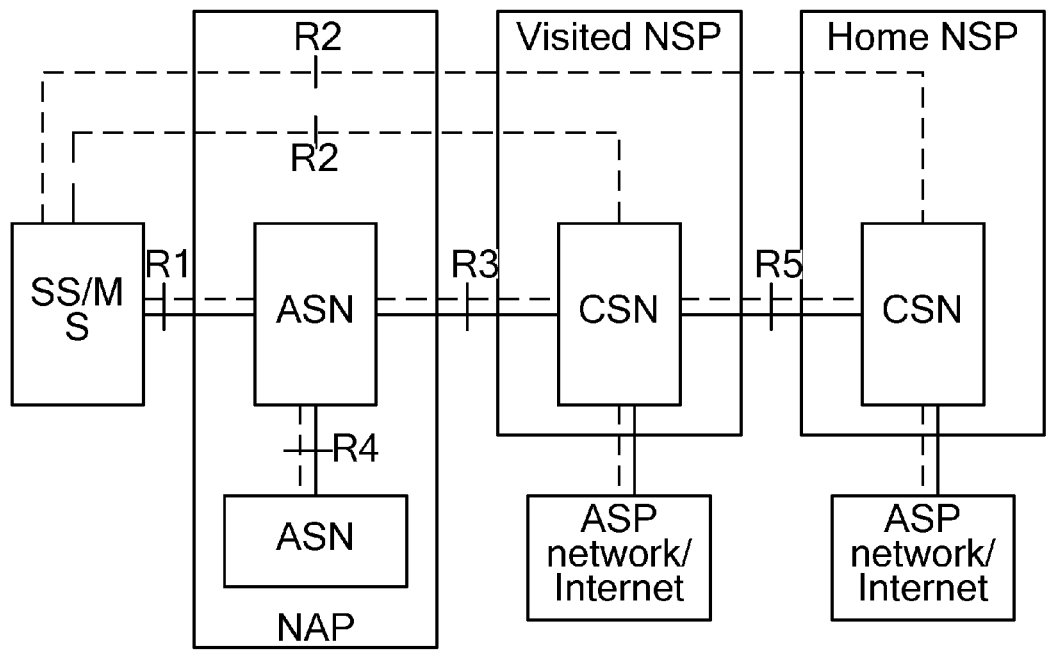
FIG. 1 shows a structure of a WiMax network in the prior art.
Figure 2:
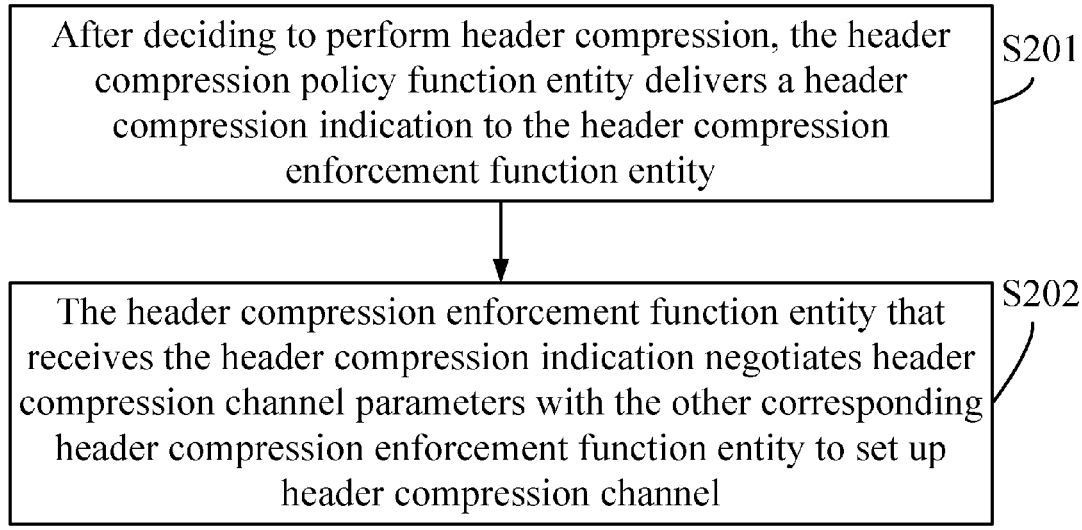
FIG. 2 is a flowchart of a method provided in an embodiment of the present disclosure.

As shown in FIG. 2, the method for setting up header compression communication in an embodiment of the present disclosure includes the following steps:

Step 201: After deciding to perform header compression, the header compression policy function entity delivers a header compression indication to the header compression enforcement function entity.

Step 202: The header compression enforcement function entity that receives the header compression indication negotiates header compression channel parameters with the other corresponding header compression enforcement function entity to set up header compression channel.

In this embodiment, after deciding to perform header compression, the header compression policy function entity delivers a header compression indication to the header compression enforcement function entity; the header compression enforcement function entity that receives the header compression indication negotiates header compression channel parameters with the other corresponding header compression enforcement function entity to set up a header compression channel, thus saving the radio network resources and improve the QoS.

The header compression enforcement function entity may employ an ROHC mechanism, CRTP header compression mechanism, or ECRTP header compression mechanism.

The header compression enforcement function entity may be located in the MS, a BS or anchor Data Path Function (DPF) entity in the ASN. The header compression policy function entity may be located in the MS, a Policy Function (PF) entity in the ASN, or a PF entity in the CSN. The PF entity in the ASN may include: a BS, an anchor Service Flow Authorizer (SFA), and a serving SFA or anchor DPF. The PF entity in the CSN may include a PF, a Policy and Charging Rule Function (PCRF) entity, or an Authentication Authorization Accounting (AAA) server.

It is assumed that the anchor DPF entity, anchor SFA, and serving SFA are logical function entities. In the actual networking, such entities may be a separate physical entity, or integrated in the BS or gateway as a logical function entity.

The header compression policy function entity may decide whether to perform header compression according to the QoS requirements of the service flow and the available resources.

Depending on the policy decision point, the scenarios are as follows:

1. The PF entity in the CSN decides the header compression policy, and the PF entity in the ASN may send their header compression policy and/or idle resource information to the PF entity in the CSN. The PF entity in the CSN sends a header compression decision indication.

2. Alternatively, the PF entity in the CSN decides the header compression policy. The causes for this scenario include but are not limited to: The PF entity in the ASN does not report its header compression policy or idle resource information to the PF entity in the CSN; or the PF entity in the ASN reports such information to the PF entity in the CSN, and the PF entity in the CSN has a precedence over the PF entity in the ASN in deciding the header compression policy; and so on.

3. Alternatively, the PF entity in the CSN sends its header compression policy and/or idle resource information to the PF entity in the ASN, and the PF entity in the ASN sends a header compression decision indication.

4. Alternatively, the PF entity in the ASN decides the header compression policy. The causes for this scenario include but are not limited to: The PF entity in the CSN does not deliver its header compression policy or idle resource information to the PF entity in the ASN; or the PF entity in the CSN delivers such information to the PF entity in the ASN, and the PF entity in the ASN has a precedence over the PF entity in the CSN in deciding the header compression policy; and so on.

When the header compression is performed through the ROHC mechanism, the header compression channels may be set up based on a service flow, or based on an MS; or some header compression channels are set up based on the service flow scheduling type and others are set up based on the service flow; or the header compression channels are set up based on the service flow scheduling type.

When one header compression enforcement function entity is located in a MS and the other header compression enforcement function entity is located in the BS in the ASN, the header compression channel parameters may be negotiated between the MS and the ASN through a dynamic service flow setup request (DSA-REQ), dynamic service flow setup response (DSA-RSP), dynamic service flow modification request (DSC-REQ), dynamic service flow modification response (DSC-RSP), or a predefined message.

When one header compression enforcement function entity is located in the MS and the other header compression enforcement function entity is located in the anchor DPF in the ASN, if the header compression channels are set up based on a service flow, the header compression channel parameters may be negotiated between the MS and the ASN through a resource reservation request (RR-REQ), resource reservation response (RR-RSP), DSA-REQ, DSA-RSP, DSC-REQ, DSC-RSP, or predefined message, or any combination thereof.

When one header compression enforcement function entity is located the MS and the other header compression function entity is located in the anchor DPF in the ASN, if the header compression channels are set up based on an MS, or if the header compression channels are set up based on a service flow scheduling type, the header compression channel parameters may be negotiated between the MS and the ASN through a subscriber basic capability request (SBC-REQ), subscriber basic capability response (SBC-RSP), registration request (REG-REQ), registration response (REG-RSP), or a predefined message, or any combination thereof, and through a NetEntry MS State Change REQ or NetEntry MS State Change ACK.

When the header compression is performed through an ROHC mechanism, if one header compression enforcement function entity is located in the MS, and this MS accesses the network initially, the fixed parameters in the header compression channel parameters may be negotiated through an SBC-REQ, SBC-RSP, REG-REQ, and REG-RSP; and the specific parameters in the header compression channel parameters may be negotiated between the header compression enforcement function entity that receives the header compression indication and the other header compression enforcement function entity through a dynamic service flow message.

If one header compression enforcement function entity is located in the MS and this MS accesses the network initially, the method includes: The mapping mode of setting up the header compression channel is negotiated between the MS and the network, and the header compression enforcement function entity that receives the header compression indication and the other header compression enforcement function entity use the negotiated mapping mode of setting up the header compression channel to set up a header compression channel. Moreover, the mapping mode of the header compression channel may be negotiated through a Subscriber Basic Capability (SBC) message or Registration (REG) message.

Before the header compression enforcement function entity receives the header compression indication from the header compression policy function entity, the process further includes:

The header compression policy function entity receives the MS header compression capability or policy sent by the network, and/or the header compression capability or policy supported by the network; and the header compression policy function entity determines and delivers a header compression indication to the header compression enforcement function entity according to the header compression capability or policy.

The header compression policy function entity is an AAA server or PCRF.

When the header compression policy function entity is a PCRF, the header compression policy function entity receives the header compression capability or policy sent by the network in the following way:

The PCRF receives the header compression capability or policy from the network through the AAA server.

The header compression indication is an extended value of a QoS Class Indication (QCI), an extended value of a media type, or an independent property value.

The header compression enforcement function entity receives the control policy from the header compression policy function entity. The control policy is: to give up setting up the service flow or to set up a non-compressed service flow if the setup of the header compression channel fails.

When the header compression enforcement function entity employs a robust header compression mechanism, the header compression policy function entity is an ROHC policy function entity, the header compression enforcement function entity is an ROHC enforcement function entity, the header compression channel parameters are ROHC channel parameters, and the header compression channel is an ROHC channel.

Taking the ROHC mechanism as an example, the technical solution under the present disclosure is described below.

The ROHC policy function entity may be located in the MS, at the PF entity in the ASN, or at the PF entity in the CSN. The policy function entity in the ASN may include a BS, anchor SFA, or anchor DPF. The PF entity in the CSN may include a PF, PCRF, or AAA server. The ROHC enforcement function entity may be located in the MS, or BS or DPF in the ASN.

An ROHC channel includes two ROHC enforcement function entities: One is an ROHC compressor, and the other is an ROHC decompressor; one is located in the MS, and the other is located in the BS or DPF in the ASN.

The ROHC policy function entity decides whether to perform header compression according to the QoS requirements of the service flow and the available resources. If the ROHC policy function entity is located in the MS, the MS decides the ROHC operation for the uplink service flow. If the ROHC policy function entity is located in the ASN domain, the BS or anchor DPF in the ASN domain decides the ROHC operation for the downlink service flow.

The ROHC channel is set up through one of the following four mapping modes:

(i) An ROHC channel is set up based on a service flow, namely, the ROCH channel is in a one-to-one mapping relation with the service flow.

(ii) ROHC channels are set up based on an MS, namely, one ROHC channel is set up for the uplink service flow of an MS, and the other ROHC channel is set up for the downlink service flow of the MS.

This mode of setting up the ROHC channel brings these benefits: Two ROHC channels are set up between an MS and a network to bear the uplink service flow and the downlink service flow of the MS respectively, thus simplifying the process of negotiating the ROHC channel parameters massively, and simplifying the ROHC communication system.

(iii) ROHC channels are set up based on a service scheduling type. That is, for any service flow scheduling type between the MS and the network such as Unsolicited Grant Service (UGS), one ROHC channel is set up on the uplink service flow and the other ROHC is set up on the downlink service flow, and the service flows which undergo the ROHC operation and are of this service flow scheduling type are carried over this ROHC channel. The ROHC enforcement function entities may negotiate with each other to determine the service flow of which service flow scheduling type undergoes the ROHC operation.

If the mapping is set up between the ROHC channel and the link layer in mode (iii), the granularity of mapping falls between the mapping set up in mode (i) and the mapping set up in mode (ii). Mode (iii) draws upon the benefits of mode (ii), namely, simplifies the process of negotiating the ROHC channel parameters and the ROHC communication system, and overcomes the instability of the ROHC algorithm state machine caused by too large granularity of the mapping between the ROHC channel and the link layer.

(iv) Hybrid mode: Some ROHC channels are set up based on the service flow scheduling type, and others are set up based on the service flow. For example, the ROHC channels for the UGS service and the Extended Real-Time Polling Service (ertPS) are set up based on the service flow, and the ROHC channels for other services such as Best Effort (BE) are set up based on the air interface scheduling type.

If one ROHC enforcement function entity is located in the MS and the other ROHC enforcement function entity is located in the BS in the ASN, the ROHC channel parameters may be negotiated between the MS and the ASN through a DSA-REQ, DSA-RSP, DSC-REQ, or DSC-RSP.

When one ROHC enforcement function entity is located in the MS and the other ROHC enforcement function entity is located in the DPF in the ASN, if the ROHC channel is set up based on a service flow, the ROHC channel parameters may be negotiated between the MS and the ASN through an RR-REQ, RR-RSP, DSA-REQ, DSA-RSP, DSC-REQ, DSC-RSP, or any combination thereof.

When one ROHC enforcement function entity is located in the MS and the other ROHC enforcement function entity is located in the DPF in the ASN, if the ROHC channel is set up on the uplink service flow and the downlink service flow based on an MS, or, if the ROHC channel is set up based on the service flow scheduling type, the ROHC channel parameters may be negotiated between the MS and the ASN through an SBC-REQ, SBC-RSP, REG-REQ, REG-RSP, or any combination thereof, and through a NetEntry MS State Change REQ or NetEntry MS State Change RSP.

If the ROHC channel is set up based on the service flow scheduling type, the service flow scheduling type of the service flow that requires ROHC operation may be negotiated before the ROHC enforcement function entity that receives the header compression indication sets up an ROHC channel with the other corresponding ROHC channel.

According to the foregoing four mapping relations, the ROHC policy function entity delivers the policy in different modes: When the mapping mode of the ROHC channel is specific to a service flow, the policy sent by the CSN to the ASN is based on the service flow. For example, a sub-property indicative of whether to allow the header compression is added into the Packet-Flow Descriptor property or the QoS-Descriptor property in a Remote Authentication Dial In User Server (RADIUS) message, and the sub-property may specify whether the allowed header compression type is ROHC or other header compression mode, specify the header compression feedback mode (namely, whether feedback is required), and also specify whether the Packet-Flow or the data flow with this QoS is allowed for bearing other data flow feedback information.

If the mapping relation of the ROHC channel is specific to an MS, the policy sent by the CSN to the ASN is based on the MS. For example, a property specific to the MS is added into a RADIUS message, and the property specifies: whether to allow header compression for the uplink or downlink data, the type of the header compression allowed for the uplink or downlink data, whether the uplink or downlink data can carry feedback information, and whether the uplink or downlink data needs feedback.

If the mapping mode of the ROHC channel is specific to a service scheduling type, the policy sent by the CSN to the ASN is based on the service scheduling type. For example, a property list is added into a RADIUS message. That is, a property related to the header compression is defined for each service scheduling type, and the property specifies: whether to allow header compression for the uplink or downlink data of this service type, the type of the header compression allowed for the uplink or downlink data of this service type, whether the uplink or downlink data of this service type can carry feedback information, and whether the uplink or downlink data of this service type needs feedback.

For the hybrid mapping mode, the technical solution specific to the mapping mode is applicable.

The ROHC channel parameters may include the maximum context identifier (MAX_CID), long/short property of the context identifier (LARGE_CIDS), set of formats of the data flow that undergoes the header compression (PROFILES), FEEDBACK_FOR, Maximum Rebuilding Receiving Unit (MRRU), or any combination thereof. The ROHC channel parameters may be divided into fixed parameters of the ROHC channel, and specific parameters of the ROHC channel. Among the ROHC channel parameters, the FEEDBACK_FOR is a specific parameter of the ROHC channel, and the parameters except the FEEDBACK_FOR are fixed parameters of the ROHC channel.

If one ROHC enforcement function entity is located in the MS and this MS accesses the network initially, the process further includes: The fixed parameters of the ROHC channel may be negotiated through an SBC-REQ and SBC-RSP, or through a REG-REQ and REG-RSP.

In this case, the ROHC channel parameter negotiation between the ROHC enforcement function entity that receives the header compression indication and the other ROHC enforcement function entity includes: The specific parameters of the ROHC channel may be negotiated through a dynamic service flow message.

When the MS accesses the network initially, the method further includes: The MS negotiates the ROHC channel mapping mode with the network, and this negotiation process may be implemented through an SBC or REG message. Therefore, the header compression enforcement function entity that receives the header compression indication and the other header compression enforcement function entity may use the negotiated mapping mode of setting up an ROHC channel to set up the ROHC channel.

If the ROHC channel is set up based on the service flow scheduling type, after an ROHC enforcement function entity receives an indication of setting up the ROHC channel based on the service flow scheduling type, where the indication indicates which service flow scheduling type needs to undergo the ROHC operation, the ROHC enforcement function entity sends the indication information to the other corresponding ROHC enforcement function entity, whereupon the two ROHC enforcement function entities negotiate the ROHC channel parameters according to the indication information.

The embodiments of the present disclosure are elaborated below.

Embodiment 1

Figure 3:
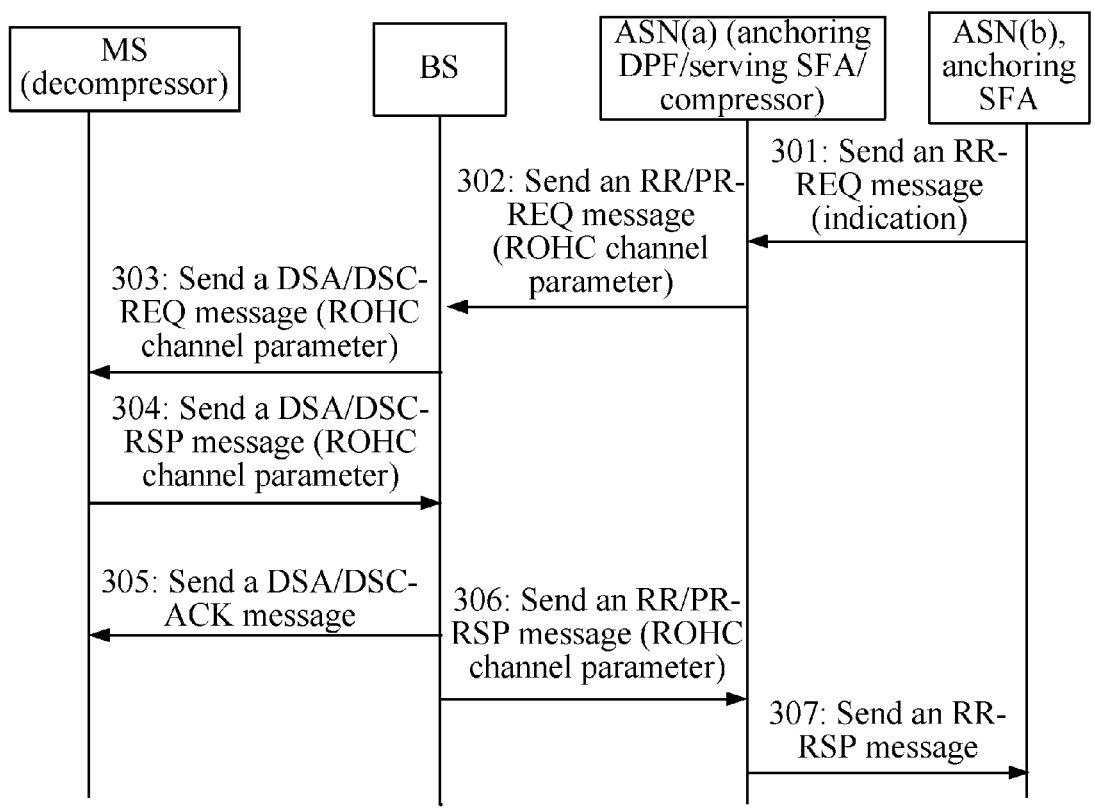
FIG. 3 is a flowchart of a method provided in the first embodiment of the present disclosure.

As shown in FIG. 3, when the network initiates setup of a downlink service flow (downlink ROHC), the process of implementing this embodiment is as follows:

Step 301: The anchor SFA in the ASN(b) sends an RR-REQ message to the anchor DPF/serving SFA in the ASN(a).

This message includes an indication about whether to perform ROHC header compression for each service flow.

Step 302: The serving SFA of the gateway corresponding to the anchor DPF makes a decision according to availability of ROHC header compression. When ROHC header compression is required, the serving SFA sends an RR-REQ or path request (PR-REQ, Path-Reg-REQ) to the BS. This message carries the ROHC channel parameters which may include: MAX_CID, LARGE_CIDS, PROFILES, FEEDBACK_FOR, MRRU, or any combination thereof.

Step 303: The BS sends a DSA-REQ or DSC-REQ message to the MS. The message carries the ROHC channel parameters corresponding to the service flow.

Step 304: The MS sends a DSA-RSP or DSC-RSP message to the BS. The message carries all or part of the ROHC channel parameters corresponding to the service flow.

Step 305: The BS sends a DSA-ACK or DSC-ACK message to the MS. This step is optional.

Step 306: The BS sends an RR-RSP or Path-Reg-RSP message to the serving SFA. The message carries all or part of the ROHC channel parameters corresponding to the service flow.

Step 307: The serving SFA sends an RR-RSP message to the anchor SFA. The message carries a result of setting up or modifying the service flow. By now, the ASN and the MS finish negotiation of the ROHC channel parameters, and set up an ROHC channel.

In the foregoing embodiment, the ROHC function in the ASN is implemented on the anchor DPF. If the ROHC function in the ASN is implemented on the BS, the ROHC channel parameters are negotiated between the BS and the MS. That is, in step 302, the message sent by the serving SFA to the BS carries an indication about whether to perform ROHC header compression for each service flow. The message in step 306 carries no ROHC channel parameters.

In this embodiment, when the network initiates setup of a downlink service flow and the header compression policy function entity such as anchor SFA decides to perform header compression, the anchor SFA delivers a header compression indication to a header compression enforcement function entity such as anchor DFA. The header compression enforcement function entity that receives the header compression indication negotiates header compression channel parameters with the other corresponding header compression enforcement function entity such as MS to set up a header compression channel, thus saving the radio network resources and improving the QoS.

Further, in this embodiment, the header compression policy decision process may also be:

The ASN sends information about the ASN header compression policy and the idle resources to the AAA server in the MS access authentication process. In this case, the ASN may reserve the header compression resources. After receiving such information, the AAA server may decide the header compression policy in light of the policies (such as MS subscription policy and/or the policies of the AAA server itself) maintained by the AAA server. The AAA server sends a result of deciding the header compression policy to the ASN, and the ASN executes the result of deciding the header compression policy. If the ASN has reserved header compression resources but the result of deciding the header compression policy indicates no need of header compression, the ASN may release the header compression resources.

Embodiment 2

Figure 4:
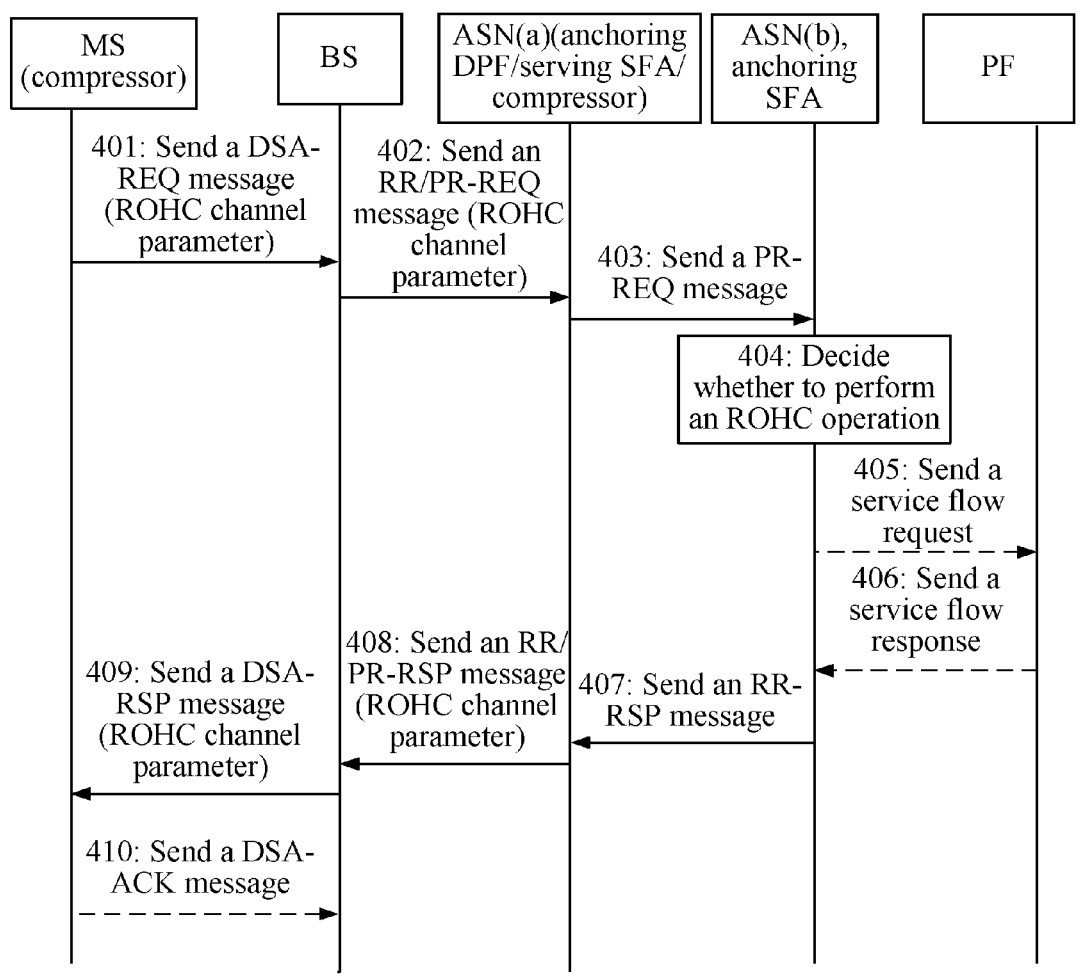
FIG. 4 is a flowchart of a method provided in the second embodiment of the present disclosure.

As shown in FIG. 4, when the MS initiates setup of an uplink service flow (uplink ROHC), the process of implementing this embodiment is as follows:

Step 401: The MS decides to perform an ROHC operation for a service flow, and sends a DSA-REQ or DSC-REQ message to the BS. The message may carry the relevant ROHC channel parameters.

Step 402: The BS sends an RR-REQ or Path-Reg-REQ message to the serving SFA. The message may carry the ROHC channel parameters corresponding to the service flow.

Step 403: The serving SFA sends an RR-REQ message to the anchor SFA, requesting to set up or modify the service flow. This message may carry the ROHC indication and/or ROHC channel parameters.

Step 404: The anchor SFA decides whether to perform an ROHC operation according to the QoS requirements of the service flow and the resource availability.

Step 405: Optionally, the anchor SFA sends a service flow request to the PF entity in the CSN, requesting the PF entity in the CSN to set up or modify the service flow. The service flow request may carry an ROHC indication which requests the PF entity in the CSN to make an ROHC decision. The service flow request may be forwarded through a Proxy Policy Control Enforcement Function (Proxy-PCEF). The PF entities in the CSN include a PF or PCRF, or combination of the Proxy-PCEF and the PCRF.

Step 406: Optionally, the PF entity sends a service flow response to the anchor SFA after making a decision. If it is the PF entity that decides whether to perform an ROHC operation, the PF entity returns an ROHC decision result message, which may be forwarded through the Proxy-PCEF.

Step 407: The anchor SFA sends an RR-RSP message to the serving SFA. The message carries a result of the ROHC decision made by the anchor SFA or PF entity.

Step 408: The serving SFA sends an RR-RSP or Path-Reg-RSP message to the BS according to the received ROHC decision result. The message may carry some ROHC channel parameters such as FEEDBACK_FOR.

Step 409: The BS sends a DSA-RSP or DSC-RSP message to the MS. The message may carry some ROHC channel parameters. By now, the MS and the ASN finish negotiation of the ROHC channel parameters.

Step 410: Optionally, the MS sends a DSA-ACK or DSC-ACK message to the BS.

If the ROHC function in the ASN is implemented on the BS, the ROHC channel parameters are negotiated between the MS and the BS.

In this embodiment, after deciding to perform header compression, the header compression policy function entity (such as anchor SFA) or the PF entity in the CSN (such as PCRF) delivers a header compression indication to the header compression enforcement function entity such as BS; the header compression enforcement function entity that receives the header compression indication negotiates header compression channel parameters with the other corresponding header compression enforcement function entity to set up a header compression channel, thus saving the radio network resources and improving the QoS.

Embodiment 3

Figure 5:
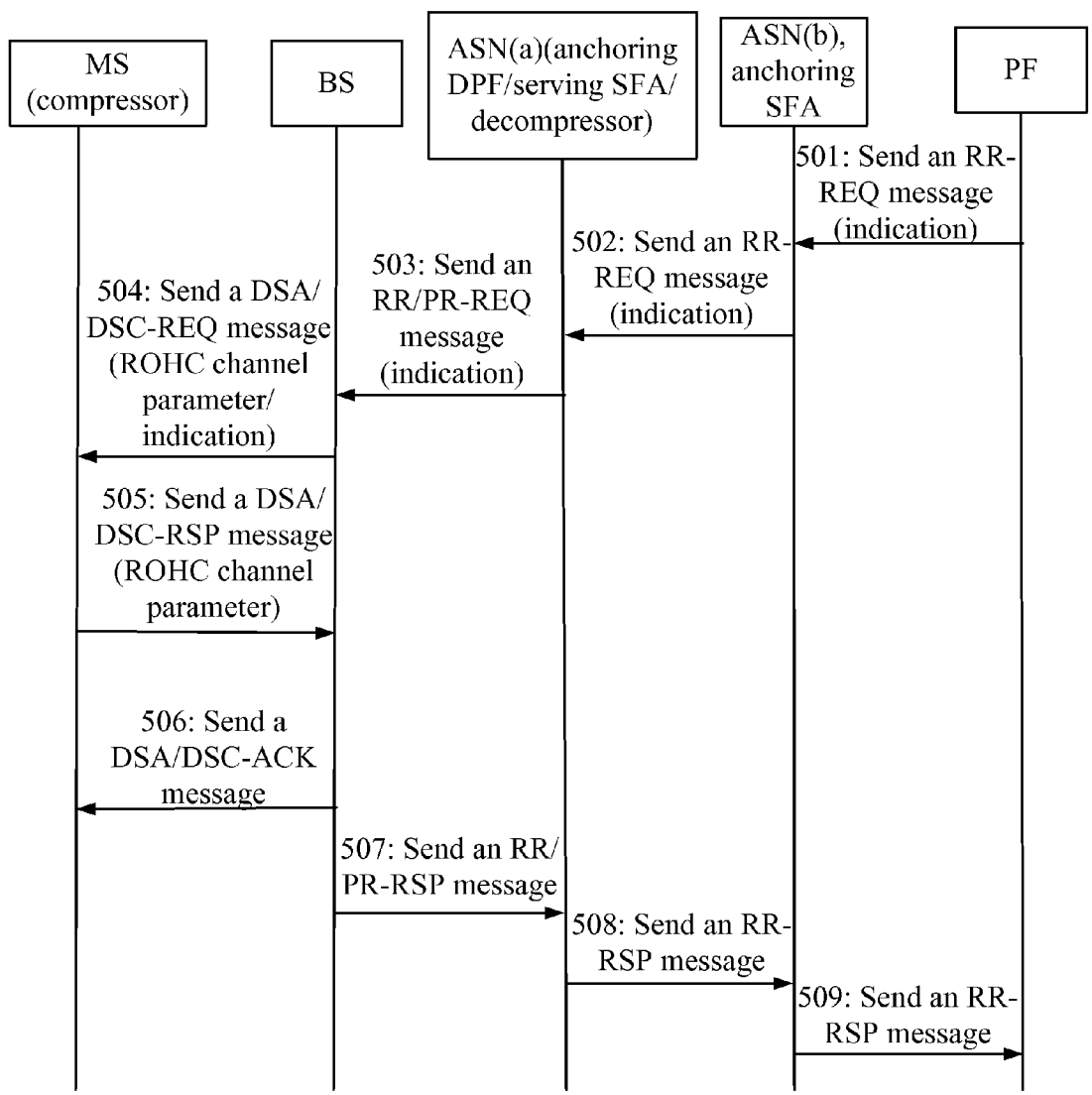
FIG. 5 is a flowchart of a method provided in the third embodiment of the present disclosure.

As shown in FIG. 5, when the PF entity in the CSN triggers setup of the service flow, the process of implementing this embodiment is as follows:

Step 501: The PF entity in the CSN may decide whether to perform an ROHC operation, and send RR-REQ message to the anchor SFA. The message may carry an indication about whether to perform an ROHC header compression operation, and may be forwarded through a Proxy-PCEF.

The PF entities in the CSN include: an AAA server, a PF or PCRF, or combination of the Proxy-PCEF and the PCRF.

Further, in this embodiment, before the PF entity in the CSN decides whether to perform an ROHC operation, the header compression policy decision process may include:

The ASN sends information about ASN header compression policy and the idle resources to the AAA server in the MS access authentication process. In this case, the ASN may reserve the header compression resources. After receiving such information, the AAA server may decide the header compression policy in light of the policies (such as MS subscription policy and/or the policies of the AAA server itself) maintained by the AAA server. The AAA server sends a result of deciding the header compression policy to the ASN, and the ASN executes the result of deciding the header compression policy. If the ASN has reserved header compression resources but the result of deciding the header compression policy indicates no need of header compression, the ASN may release the header compression resources.

Alternatively, the PCEF sends information about the ASN header compression policy and the idle resources to the PCRF in the service initiation process. In this case, the PCEF may reserve the header compression resources. After receiving such information, the PCRF may decide the header compression policy in light of the policies (such as MS subscription policy and/or the policies of the PCRF itself) maintained by the PCRF. The PCRF sends a result of deciding the header compression policy to the PCEF, and the PCEF executes the result of deciding the header compression policy. If the PCEF has reserved header compression resources but the result of deciding the header compression policy indicates no need of header compression, the PCEF may release the header compression resources.

Step 502: The anchor SFA sends an RR-REQ message to the serving SFA. The message may carry an indication about whether to perform an ROHC header compression operation.

If the RR-REQ message received by the anchor SFA carries no ROHC header compression indication, the anchor SFA may decide whether to perform ROHC header compression.

Step 503: The serving SFA sends an RR-REQ or Path-Reg-REQ message to the BS. The message may carry an indication about whether to perform ROHC header compression.

Step 504: The BS sends a DSA-REQ or DSC-REQ message to the MS. The message carries ROHC channel parameters and an indication about whether to perform an ROHC header compression operation.

If the RR-REQ or Path-Reg-REQ message received by the BS carries no ROHC header compression indication, the BS decides whether to perform ROHC header compression.

Step 505: The MS negotiates with the BS according to the received ROHC channel parameters, and then sends a DSA-RSP or DSC-RSP message to the BS. The message carries part or all of the ROHC channel parameters.

Step 506: Optionally, the BS sends a DSA-ACK or DSC-ACK message to the MS.

Step 507: The BS finishes the ROHC channel parameter negotiation with the MS, and sends an RR-RSP or Path-Reg-RSP message to the serving SFA.

Step 508: The serving SFA sends an RR-RSP message to the anchor SFA. The message carries a result of setting up the service flow.

Step 509: The anchor SFA sends an RR-RSP message to the PF entity. The message carries the result of setting up the service flow, and may be forwarded through a Proxy-PCEF.

In this embodiment, the ROHC function is implemented on the BS. The process of setting up a service flow in this embodiment may be preset service flow setup process or dynamic service flow setup process triggered by a PF entity.

In this embodiment, when the PF entity in the CSN triggers setup of the service flow, the PF entity delivers an indication to the BS if deciding to perform ROHC operation; or the PF entity or BS in the ASN decides the need of the ROHC operation, and the BS and the MS negotiate the ROHC channel parameters to set up a header compression channel, thus saving the radio network resources and improving the QoS.

Embodiment 4

Figure 6:
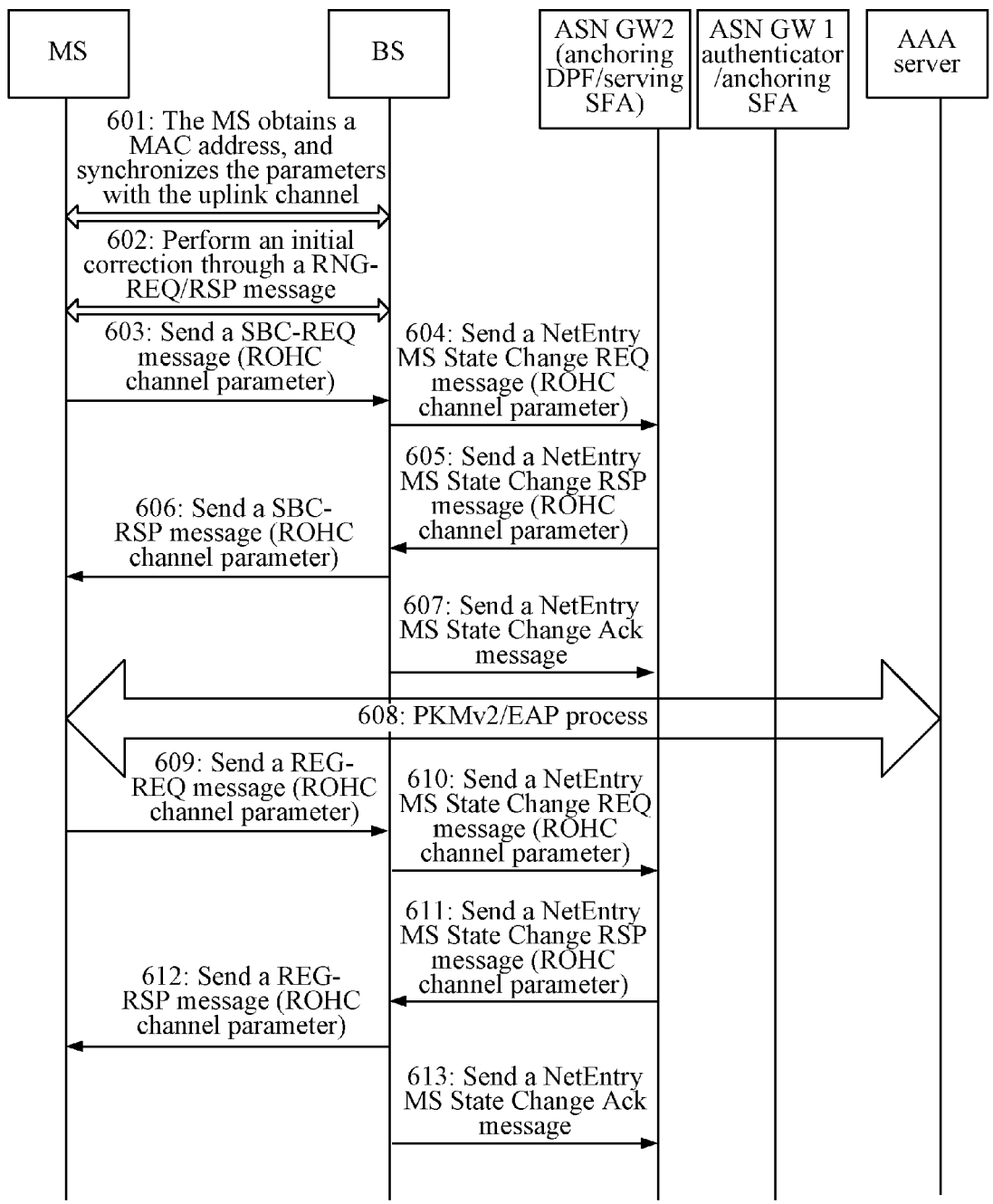
FIG. 6 is a flowchart of a method provided in the fourth embodiment of the present disclosure.

The ROHC channel parameters except FEEDBACK_FOR may be regarded as fixed capabilities of the MS or ASN. The capabilities of the MS keep unchanged, and the capabilities of the ASN keep unchanged before handover. Therefore, the fixed parameters of the ROHC channel except FEEDBACK_FOR may be carried in the SBC-REQ, SBC-RSP, REG-REQ, or REG-RSP message of the network initially accessed by the MS for the purpose of negotiation. As shown in FIG. 6, when the MS accesses the network initially, the process of implementing this embodiment is as follows:

Step 601: The MS searches the downlink channel, receives the DL-MAP message to obtain a Media Access Control (MAC) address, and synchronizes the parameters with the uplink channel.

Step 602: An initial ranging process is performed between the MS and BS through an RNG-REQ or RNG-RSP.

Step 603: The MS sends an SBC-REQ message to the BS. The message carries ROHC channel parameters.

Step 604: The BS sends a NetEntry MS State Change REQ message to the anchor DPF/serving SFA of the ASN-GW2. The message carries ROHC channel parameters.

Step 605: The anchor DPF/serving SFA sends a NetEntry MS State Change REQ message to the BS. The message carries ROHC channel parameters.

Step 606: The BS sends an SBC-RSP message to the MS. The message carries ROHC channel parameters.

Step 607: The BS sends a NetEntry MS State Change ACK message to the anchor DPF/serving SFA.

Steps 603-607: The basic capability negotiation is performed between the MS and the network. The message may be specific to the granularity of the ROHC channel, for example, specific to the MS or the service type, and may carry the ROHC channel parameters except FEEDBACK_FOR. If the ROHC function is implemented on the BS, only the SBC-REQ or SBC-RSP message carries the ROHC channel parameters.

Step 608: A normal PKMv2 and Extensible Authentication Protocol (EAP) process is performed between the MS and the network.

Step 609: The MS sends a REG-REQ message to the BS. The message carries ROHC channel parameters.

Step 610: The BS sends a NetEntry MS State Change REQ message to the anchor DPF/serving SFA. The message carries ROHC channel parameters.

Step 611: The anchor DPF/serving SFA sends a NetEntry MS State Change RSP message to the BS. The message carries the ROHC channel parameters.

Step 612: The BS sends a REG-RSP message to the MS. The message carries the ROHC channel parameters.

Step 613: The BS sends a NetEntry MS State Change ACK message to the anchor DPF/serving SFA.

Steps 609-613: The MS registers with on the network. If no ROHC channel parameter negotiation is performed in steps 603-607, the ROHC channel parameter negotiation may be performed in steps 609-613.

More than one ROHC channel may be set up between the MS and the ASN. Several ROHC channels are set up based on the QoS scheduling type; or some ROHC channels are set up based on the scheduling type and others are set up based on the service flow. For example, for the UGS service and ertPS service, the ROHC channel is set up based on the service flow; for other services such as BE, the ROHC channel is set up based on the air interface scheduling type.

In this embodiment, it is the ROHC enforcement function entity (namely, MS and/or ASN) that decides whether to perform the ROHC operation. The context of the ROHC corresponds to a flow of an IP quintuple identifier. If the MS specifies no FEEDBACK_FOR parameter in the process of accessing the network initially, the parameter may be specified through a dynamic service flow message in the subsequent service flow setup process.

Therefore, in this embodiment, the MS and the ASN negotiate the ROHC channel parameters to set up header compression channels, thus saving the radio network resources and improving the QoS.

Embodiment 5

Figure 8:
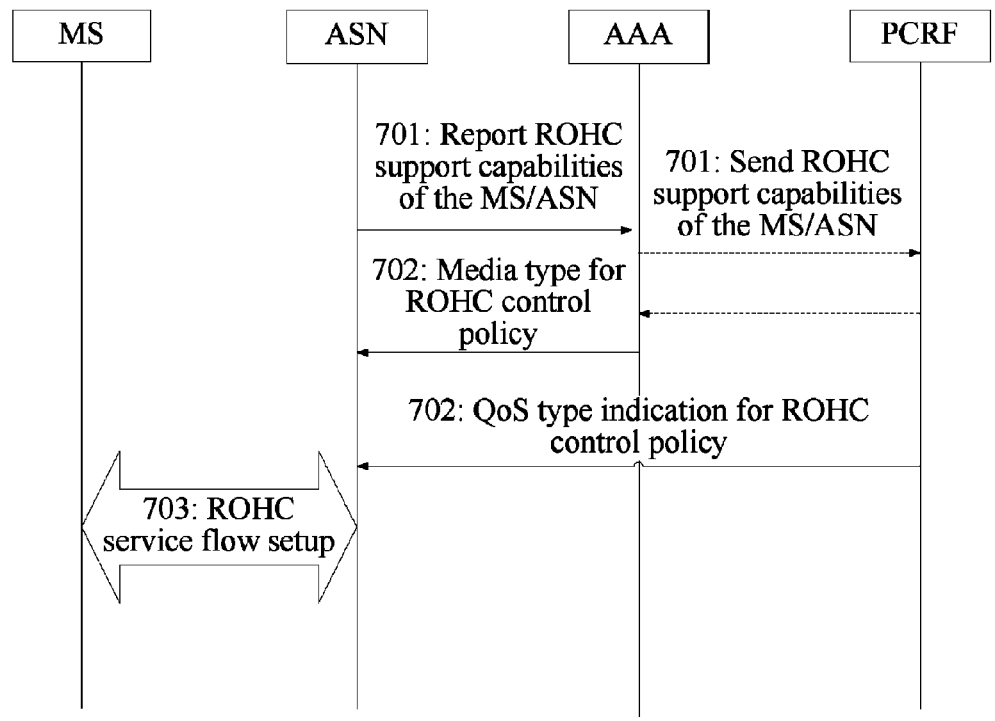
FIG. 8 is a flowchart of a header compression policy function entity determining a header compression policy in the method provided in an embodiment of the present disclosure.

This embodiment deals with a method for a header compression policy function entity to determine the header compression policy, as shown in FIG. 8.

Step 701: The ASN reports the ROHC support capability or policy of the terminal (such as MS) and/or ASN to the CSN, for example, to a PCRF or AAA server in the CSN.

If the ROHC support capability or policy is reported to the PCRF, the PCRF may receive the header compression capability or policy through the AAA server. That is, the ASN reports such information to the AAA server first, and the AAA server forwards such information to the PCRF when the AAA server obtains the information or when the AAA server receives a forwarding request from the PCRF.

Step 702: The AAA server or PCRF may determine whether the ASN and/or MS supports the ROHC according to the header compression capability or policy. At the time of delivering the service flow parameter (which carries a header compression indication), the header compression indication may indicate whether the service flow requires ROHC compression.

The header compression indication is an extended value of a QCI, an extended value of a media type, or an independent property value. That is, the header compression indication is expressed by different values, for example, QCI=1 indicates UGS service, and QCI=N+1 indicates the UGS service that requires header compression, where N is a fixed constant.

The AAA server or PCRF may deliver a control policy while delivering the service flow parameter. The control policy is: to give up setting up the service flow, or to ignore the ROHC property and set up a non ROHC-compressed service flow if the setup of the ROHC channel fails. The control policy is applicable to the scenario of setting up the service flow initially, and the scenario of setting up a service flow again after the network-side header compression enforcement function entity is relocated.

Step 703: The ASN decides whether to perform header compression for a service flow according to the extended value of the QCI, or the extended value of the media type, or other indication information. Meanwhile, the ASN decides the service flow processing mode in the scenario of being unable to set up the ROHC channel.

Therefore, in this embodiment, the AAA determines whether to perform ROHC operations according to the capabilities of the MS and/or ASN, and defines the solution to the scenario of being unable to set up a header compression channel, thus perfecting the process of setting up the ROHC channel, reducing the probability of failure of setting up the ROHC channel, and increasing the flexibility of ASN processing in the scenario of being unable to set up an ROHC channel.

A communication system provided in an embodiment of the present disclosure includes:

a header compression policy function entity, adapted to deliver a header compression indication to the first header compression enforcement function entity or the second header compression enforcement function entity if deciding to perform header compression;

a first header compression enforcement function entity, adapted to negotiate header compression channel parameters with the second header compression enforcement function entity after receiving a header compression indication; and a second header compression enforcement function entity, adapted to negotiate header compression channel parameters with the first header compression enforcement function entity after receiving the header compression indication.

The header compression may be performed through a robust header compression mechanism, CRTP header compression mechanism, or ECRTP header compression mechanism.

When the first header compression enforcement function entity is located in the MS, the second header compression enforcement function entity is located in the BS or anchor DPF in the ASN. When the second header compression enforcement function entity is located in the MS, the first header compression enforcement function entity is located in the BS or anchor DPF in the ASN.

The header compression policy function entity is located in the MS, PF entity in the ASN, or PF entity in the CSN. The PF entity in the ASN includes: a BS, an anchor SFA or anchor DPF. The PF entity in the CSN includes a PF, a PCRF entity, or AAA server.

The header compression policy function entity includes:

a decision-making unit, adapted to decide whether to perform header compression according to the QoS requirements of the service flow and the available resources, and trigger a delivering unit after determining that header compression is required; and a delivering unit, adapted to deliver a header compression indication to the first header compression enforcement function entity as triggered by the decision-making unit.

In the embodiments of the present disclosure, after deciding to perform header compression, the header compression policy function entity delivers a header compression indication to the first header compression enforcement function entity or the second header compression enforcement function entity; the first header compression enforcement function entity negotiates header compression channel parameters with the second header compression enforcement function entity to set up a header compression channel, thus saving the radio network resources and improving the QoS.

When the header compression enforcement function entity employs a robust header compression mechanism, the header compression policy function entity is an ROHC policy function entity, the first header compression enforcement function entity is a first ROHC enforcement function entity, and the second header compression enforcement function entity is the second ROHC enforcement function entity.

Taking the ROHC header compression mechanism as an example, the system under the present disclosure is described below.

Figure 7:
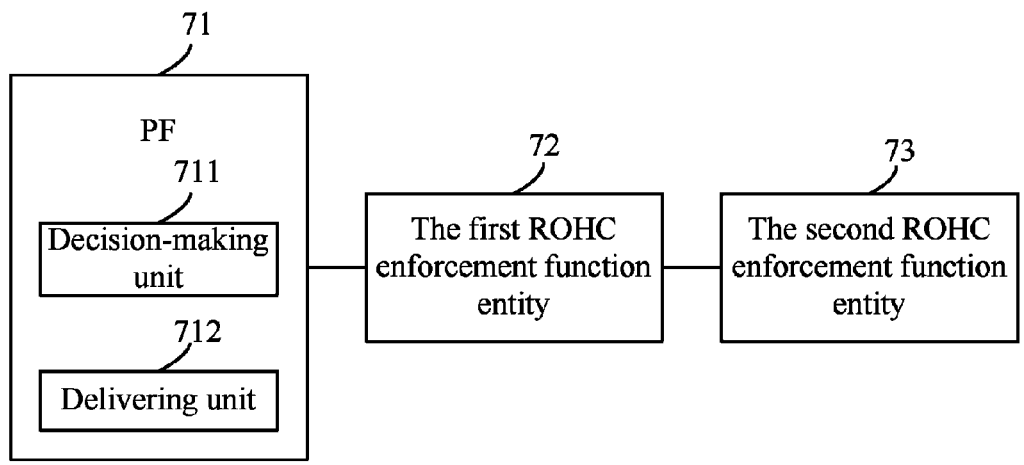
FIG. 7 shows a structure of a system provided in an embodiment of the present disclosure.

As shown in FIG. 7, the system under the present disclosure includes: an ROHC policy function entity 71, a first ROHC enforcement function entity 72, and the corresponding second ROHC enforcement function entity 73.

The ROHC policy function entity 71 includes a decision-making unit 711 and a delivering unit 712.

The first ROHC enforcement function entity 72 is an ROHC enforcement function entity, and the second ROHC enforcement function entity 73 is another ROHC enforcement function entity corresponding to the first ROHC enforcement function entity 72. That is, one ROHC enforcement function entity is a compressor, which is the ingress of the ROHC channel, and the other ROHC enforcement function entity is a decompressor, which is the egress of the ROHC channel.

The ROHC policy function entity 71 is adapted to deliver a header compression indication to the first ROHC enforcement function entity 72 after deciding to perform header compression.

The first ROHC enforcement function entity 72 negotiates ROHC channel parameters with the second ROHC enforcement function entity 73 after receiving a header compression indication.

The second ROHC enforcement function entity 73 is adapted to negotiate ROHC channel parameters with the first ROHC enforcement function entity 72.

When the first ROHC enforcement function entity 72 is located in the MS, the second ROHC enforcement function entity 73 is located in the BS or anchor DPF in the ASN. When the second ROHC enforcement function entity 73 is located in the MS, the first ROHC enforcement function entity 72 is located in the BS or anchor DPF in the ASN.

The ROHC policy function entity 73 is located in the MS, PF entity in the ASN, or PF entity in the CSN.

The PF entities in the ASN include: BS, anchor SFA, or anchor DPF.

The PF entities in the CSN includes: PF, PCRF, or AAA server.

When the ROHC policy function entity 71 is located in the anchor DPF in the ASN, the decision-making unit 711 is adapted to decide whether to perform header compression according to the QoS requirements of the service flow and the available resources, and trigger the delivering unit 712 after determining that header compression is required.

The delivering unit 712 is adapted to deliver a header compression indication to the first ROHC enforcement function entity 72 as triggered by the decision-making unit 711.

The ROHC channels may be set up based on a service flow, or based on an MS; or some ROHC channels are set up based on the service flow scheduling type and others are set up based on the service flow; or the ROHC channels are set up based on the service flow scheduling type.

If the first ROHC enforcement function entity 72 is located in the MS and the second ROHC enforcement function entity 72 is located in the BS in the ASN, or, if the second ROHC enforcement function entity 73 is located in the MS and the first ROHC enforcement function entity 72 is located in the BS in the ASN, the ROHC channel parameters are negotiated between the MS and the ASN through a DSA-REQ, DSA-RSP, DSC-REQ, or DSC-RSP message, or a predefined message.

If the first ROHC enforcement function entity 72 is located in the MS and the second ROHC enforcement function entity 72 is located in the DPF in the ASN, or, if the second ROHC enforcement function entity 73 is located in the MS and the first ROHC enforcement function entity 72 is located in the DPF in the ASN, and, when the ROHC channel is set up based on a service flow, the ROHC channel parameters are negotiated between the MS and the ASN through an RR-REQ, RR-RSP, DSA-REQ, DSA-RSP, DSC-REQ, or DSC-RSP message, or a predefined message, or any combination thereof.

When the first ROHC enforcement function entity 72 is located in the MS and the second ROHC enforcement function entity 73 is located in the DPF in the ASN, or when the second ROHC enforcement function entity 73 is located in the MS and the first ROHC enforcement function entity 72 is located in the DPF in the ASN, and, if the ROHC channel is set up on the uplink service flow and the downlink service flow respectively based on an MS, or, if the ROHC channel is set up based on the service flow scheduling type, the ROHC channel parameters are negotiated between the MS and the ASN through an SBC-REQ or SBC-RSP message, and through a NetEntry MS State Change REQ or NetEntry MS State Change RSP message.

If the ROHC channel is set up based on the service flow scheduling type, the first ROHC enforcement function entity 73 further negotiates the service flow scheduling type of the service flow that requires ROHC operation with the second ROHC enforcement function entity before setting up the ROHC channel.

The ROHC channel parameters include fixed parameters of the ROHC channel, and specific parameters of the ROHC channel.

If the first ROHC enforcement function entity 72 is located in the MS and this MS accesses the network initially, the first ROHC enforcement function entity 72 negotiates fixed parameters of the ROHC channel with the second ROHC enforcement function entity 73 through an SBC-REQ and SBC-RSP, or through a REG-REQ and REG-RSP.

In this case, the first ROHC enforcement function entity 72 negotiates specific parameters of the ROHC channel with the second ROHC enforcement function entity 73 through a dynamic service flow message after receiving a header compression indication.

If the first ROHC enforcement function entity 72 is located in the MS and this MS accesses the network initially, the first ROHC enforcement function entity 72 negotiates the mode of setting up the ROHC channel with the second ROHC enforcement function entity 73 through an SBC or REG message.

The ROHC channel parameters include: MAX_CID, LARGE_CIDS, PROFILES, FEEDBACK_FOR, MRRU, or any combination thereof.

In the technical solution to setting up header compression communication under the present disclosure, when the header compression policy function entity delivers a header compression indication to a header compression enforcement function entity, the header compression enforcement function entity negotiates header compression channel parameters with the other corresponding header compression enforcement function entity to set up a header compression channel and implement header compression communication. Compared with the radio network without the header compression mechanism, this technical solution saves the radio network resources and improves the QoS. Moreover, the radio network may be a WiMax network.

This technical solution is also applicable to other compression mechanisms such as CRTP and ECRTP. However, each header compression mechanism corresponds to a specific header compression indication, and the negotiated parameters are the specific parameters corresponding to the compression mechanism. For example, for the CRTP or ECRTP compression mechanism, the negotiated parameters are the parameters defined in the corresponding RFC.

Those skilled in the art are aware that all or part of the steps of the foregoing embodiments may be implemented by hardware instructed by a program. The program may be stored in a computer-readable storage medium. When being executed, the program performs the following steps:

A header compression enforcement function entity receives a header compression indication from a header compression policy function entity; and the header compression enforcement function entity negotiates header compression channel parameters with the other corresponding header compression enforcement function entity to set up header compression channel.

The storage medium may be a Read-Only Memory (ROM), magnetic disk, or Compact Disk (CD).

It is apparent that those skilled in the art can make modifications and variations to the present disclosure without departing from the spirit and scope of the present disclosure. The present disclosure is intended to cover the modifications and variations provided that they fall in the scope of protection defined by the following claims or their equivalents.

The invention claimed is:

1. A method for setting up header compression communication, comprising:
    deciding, by a header compression policy function entity, whether to perform header compression according to Quality of Service (QoS) requirement of service flow and available resource;
    if yes
    sending, by the header compression policy function entity, a header compression indication to a header compression enforcement function entity;
    receiving, by the header compression enforcement function entity, the header compression indication from the header compression policy function entity;
    negotiating, by the header compression enforcement function entity, a header compression channel parameter with the other corresponding header compression enforcement function entity; and
    setting up a header compression channel;
    wherein the deciding, by the header compression policy function entity, whether to perform header compression according to the QoS requirement of the service flow and the available resource comprises at least one process of:
    sending, by a Policy Function (PF) entity in an Access Service Network (ASN), header compression policy of the PF entity in the ASN and/or idle resource information the PF entity in the ASN to a PF entity in a Connectivity Service Network (CSN), making, by the PF entity in the CSN, a header compression decision indication; and
    sending, by a PF entity in a CSN, header compression policy of the PF entity in the CSN and/or idle resource information of the PF entity in the CSN to a PF entity in an ASN, making, by the PF entity in the ASN, a header compression decision indication.

2. The method of claim 1, wherein the header compression enforcement function entity employs a Robust Header Compression (ROHC) mechanism, Real-time Transport Protocol (CRTP) Header Compression mechanism, and Extended RTP (ECRTP) Header Compression mechanism.

3. The method of claim 2, wherein, if the header compression enforcement function entity employs the ROHC mechanism, the header compression channel is set up based on a service flow, or based on an MS; or some header compression channels are set up based on service flow scheduling type and others are set up based on the service flow; or based on an service flow scheduling type.

4. The method of claim 2, wherein, if the header compression enforcement function entity employs the ROHC mechanism, if any header compression enforcement function entity is located in a Mobile Station (MS), and if the MS accesses the network initially, a fixed parameter of the header compression channel parameter is negotiated through at least one of a subscriber basic capability request (SBC-REQ), subscriber basic capability response (SBC-RSP), registration request (REG-REQ), and registration response (REG-RSP);
    a specific parameter of the header compression channel parameter is negotiated between the header compression enforcement function entity that receives the header compression indication and the other header compression enforcement function entity through a dynamic service flow message.

5. The method of claim 1, wherein the header compression enforcement function entity is located in a Mobile Station (MS), the other corresponding header compression enforcement function entity is located in a Base Station (BS) or anchor Data Path Function (DPF) entity in an Access Service Network (ASN); or
    the header compression enforcement function entity is located in a BS or anchor DPF entity in the ASN, the other corresponding header compression enforcement function entity is located in an MS.

6. The method of claim 5, wherein, if one header compression enforcement function entity is located in the MS and the other header compression enforcement function entity is located in the BS in the ASN, the header compression channel parameter is negotiated between the MS and the ASN through at least one of: a dynamic service flow setup request (DSA-REQ) dynamic service flow setup response (DSA-RSP) dynamic service flow modification request (DSC-REQ) dynamic service flow modification response (DSC-RSP) and a predefined message.

7. The method of claim 5, wherein, if one header compression enforcement function entity is located in the MS and the other header compression enforcement function entity is located in the anchor DPF in the ASN, and if the header compression channel is set up based on a service flow,
    the header compression channel parameter is negotiated between the MS and the ASN through at least one of: a resource reservation request (RR-REQ), resource reservation response (RR-RSP), DSA-REQ, DSA-RSP, DSC-REQ, DSC-RSP, and a predefined message.

8. The method of claim 5, wherein, if one header compression enforcement function entity is located in the MS and the other header compression function entity is located in the anchor DPF in the ASN, the header compression channel is set up based on an MS, or the header compression channel is set up based on a service flow scheduling type;
    the header compression channel parameter is negotiated between the MS and the ASN through at least one of: a subscriber basic capability request (SBC-REQ), subscriber basic capability response (SBC-RSP), registration request (REG-REQ), registration response (REG-RSP), a predefined message, and through a NetEntry MS State Change REQ or NetEntry MS State Change ACK.

9. The method of claim 5, wherein, if any header compression enforcement function entity is located in the MS, if the MS accesses the network initially, the method further comprises:
    negotiating a mapping mode of setting up the header compression channel between the MS and the network;

the header compression channel is set up between the header compression enforcement function entity that receives the header compression indication and the other header compression enforcement function entity by using the negotiated mapping mode of setting up the header compression channel.

10. The method of claim 9, wherein the mapping mode of the header compression channel is negotiated through a Subscriber Basic Capability (SBC) message or Registration (REG) message.

11. The method of claim 1, wherein the header compression policy function entity is located in a Mobile Station (MS), a Policy Function (PF), entity in the ASN, or a PF entity in a Connectivity Service Network (CSN);
the PF entity in the ASN comprises: a BS, an anchor Service Flow Authorizer (SFA), a serving SFA or anchor Data Path Function (DPF); and
the PF entity in the CSN comprises: a PF, a Policy and Charging Rule Function (PCRF) entity, or an Authentication Authorization Accounting (AAA) server.

12. The method of claim 1, wherein, before receiving, by a header compression enforcement function entity, a header compression indication from a header compression policy function entity, the method further comprises:
receiving, by the header compression policy function entity, an MS header compression capability or policy sent by the network, and/or an header compression capability or policy supported by the network; and
determining and delivering, by the header compression policy function entity, a header compression indication to the header compression enforcement function entity according to the header compression capability or policy.

13. The method of claim 12, wherein the header compression policy function entity is an Authentication Authorization Accounting (AAA) server or Policy and Charging Rule Function (PCRF) entity;
if the header compression policy function entity is the PCRF entity, the receiving, by the header compression policy function entity, the header compression capability or policy sent by the network comprises:
receiving, by the PCRF entity, the header compression capability or policy from the network through the AAA server.

14. The method of claim 12, wherein the header compression indication is an extended value of a QoS Class Indication (QCI), an extended value of a media type, or an independent property value.

15. The method of claim 1, further comprising:
receiving, by the header compression enforcement function entity, a control policy from the header compression policy function entity; wherein,
the control policy is: to give up setting up the service flow or to set up a non-compressed service flow if the setup of the header compression channel fails.

16. A communication system, comprising: a header compression policy function entity, and a header compression enforcement function entity, wherein
the header compression policy function entity is configured to
decide whether to perform header compression according to Quality of Service (QoS) requirement of service flow and available resource; if yes, send a header compression indication to the header compression enforcement function entity;
the header compression enforcement function entity is configured to receive the header compression indication from the header compression policy function entity, negotiate a header compression channel parameter with the other corresponding header compression enforcement function entity, and set up a header compression channel;
wherein the decide whether to perform header compression according to the QoS requirement of the service flow and the available resource comprises at least one process of:
sending, by a Policy Function (PF) entity in an Access Service Network (ASN), header compression policy of the PF entity in the ASN and/or idle resource information the PF entity in the ASN to a PF entity in a Connectivity Service Network (CSN), making, by the PF entity in the CSN, a header compression decision indication; and
sending, by a PF entity in a CSN, header compression policy of the PF entity in the CSN and/or idle resource information of the PF entity in the CSN to a PF entity in an ASN, making, by the PF entity in the ASN, a header compression decision indication.

17. A header compression policy function entity, comprising: a decision-making unit and a delivering unit;
the decision-making unit is configured to decide whether to perform header compression according to QoS requirement of service flow and available resource, and trigger the delivering unit after determining that header compression is required; and
the delivering unit is configured to send a header compression indication to a header compression enforcement function entity as triggered by the decision-making unit
wherein the decide whether to perform header compression according to the QoS requirement of the service flow and the available resource comprises at least one process of:
sending, by a Policy Function (PF) entity in an Access Service Network (ASN), header compression policy of the PF entity in the ASN and/or idle resource information the PF entity in the ASN to a PF entity in a Connectivity Service Network (CSN), making, by the PF entity in the CSN, a header compression decision indication; and
sending, by a PF entity in a CSN, header compression policy of the PF entity in the CSN and/or idle resource information of the PF entity in the CSN to a PF entity in an ASN, making, by the PF entity in the ASN, a header compression decision indication.

18. A method for setting up header compression communication, comprising:
receiving, by a header compression enforcement function entity, a header compression indication from a header compression policy function entity;
negotiating, by the header compression enforcement function entity, a header compression channel parameter with the other corresponding header compression enforcement function entity; and
setting up a header compression channel;
wherein the header compression enforcement function entity is located in a Mobile Station (MS), the other corresponding header compression enforcement function entity is located in a Base Station (BS) or anchor Data Path Function (DPF) entity in an Access Service Network (ASN); or
the header compression enforcement function entity is located in a BS or anchor DPF entity in the ASN, the other corresponding header compression enforcement function entity is located in an MS;

wherein, if one header compression enforcement function entity is located in the MS and the other header compression enforcement function entity is located in the anchor DPF in the ASN, and if the header compression channel is set up based on a service flow, the header compression channel parameter is negotiated between the MS and the ASN through at least one of: a resource reservation request (RR-REQ), resource reservation response (RR-RSP), DSA-REQ, DSA-RSP, DSC-REQ, DSC-RSP, and a predefined message; or if one header compression enforcement function entity is located in the MS and the other header compression function entity is located in the anchor DPF in the ASN, the header compression channel is set up based on an MS, or the header compression channel is set up based on a service flow scheduling type; the header compression channel parameter is negotiated between the MS and the ASN through at least one of: a subscriber basic capability request (SBC-REQ), subscriber basic capability response (SBC-RSP), registration request (REG-REQ), registration response (REG-RSP), a predefined message, and through a NetEntry MS State Change REQ or NetEntry MS State Change ACK.

* * * * *